United States Patent [19]
Davidson

[11] Patent Number: 5,460,400
[45] Date of Patent: Oct. 24, 1995

[54] PASSENGER-SIDE AIR BAG MODULE WITH IMPROVED ASSEMBLY FEATURES

[75] Inventor: Phillip K. Davidson, Novi, Mich.

[73] Assignee: Takata, Inc., Auburn Hills, Mich.

[21] Appl. No.: 247,099

[22] Filed: May 20, 1994

[51] Int. Cl.⁶ .................................................. B60R 21/16
[52] U.S. Cl. ..................... 280/728.2; 280/743.1
[58] Field of Search ............................ 280/728 A, 743 R, 280/732

[56] References Cited

U.S. PATENT DOCUMENTS

| 4,153,273 | 5/1979 | Risko | 280/740 |
|---|---|---|---|
| 4,915,410 | 4/1990 | Bachelder | 280/732 |
| 4,944,527 | 7/1990 | Bishop et al. | 280/741 |
| 4,964,654 | 10/1990 | Bishop et al. | 280/743 |
| 5,062,664 | 11/1991 | Bishop et al. | 280/743 |
| 5,121,941 | 6/1992 | Mihm et al. | 280/732 |
| 5,176,400 | 1/1993 | McGuire et al. | 280/728 R |
| 5,184,843 | 2/1993 | Berger et al. | 280/728 A |
| 5,186,492 | 2/1993 | Wright et al. | 280/728 A |
| 5,197,756 | 3/1993 | Jarboe et al. | 280/728 R |
| 5,209,511 | 5/1993 | Morita | 280/728 A |
| 5,217,254 | 6/1993 | Satoh | 280/732 |
| 5,261,692 | 11/1993 | Kneip et al. | 280/728 A |

FOREIGN PATENT DOCUMENTS

| 2247214 | 2/1992 | United Kingdom . |
|---|---|---|
| 2257400 | 1/1993 | United Kingdom . |
| 9013457 | 11/1990 | WIPO . |

Primary Examiner—Kenneth R. Rice
Attorney, Agent, or Firm—Harness, Dickey & Pierce

[57] ABSTRACT

An air bag module for a passenger-side application in a motor vehicle. The module features improvements in assembly and design which substantially reduces the number of fasteners and other components needed to fabricate the assembly. A reaction housing is provided with a series of apertures along a bottom surface and an open axial end. A pair of flexible polymeric attachment members are provided which are sewn directly to open flaps of the air bag. One of the attachment members features protruding studs which interfit within associated apertures of the other attachment member. The attachment members are assembled together and the air bag assembly is loaded into the reaction housing with the studs protruding into the reaction housing apertures. Once the inflator is inserted and mounted it traps the attachment member studs in position.

15 Claims, 3 Drawing Sheets

PASSENGER-SIDE AIR BAG MODULE WITH IMPROVED ASSEMBLY FEATURES

BACKGROUND AND SUMMARY OF THE INVENTION

This invention relates to an air bag restraint system for a motor vehicle and in particular to an improved design of such device particularly adapted for a passenger-side application for frontal impact protection having improved assembly and design features.

Inflatable restraint systems are now in widespread use in motor vehicles as a passive occupant restraint device for impact protection. The air bag restraint system inflates in response to an electrical signal from one or more crash sensors mounted to the motor vehicle and provides energy absorption for the motor vehicle occupants in the event of a frontal crash. Air bag restraint systems are presently used for front seat occupants and can be broadly categorized in two groups; those for driver's-side application and those for passenger-side application. The driver's-side module is typically mounted to the motor vehicle steering wheel hub. The passenger-side module is generally mounted to the vehicle's instrument panel and provides protection for one or two front seat passengers.

Passenger-side air bag systems are in widespread use and provide excellent impact protection. Designers of such devices are, however, continuing to strive to improve their performance, quality, and reduce their costs through improvements in assembly operations and design. In a typical design of a passenger-side module, a tub shaped metal reaction housing typically made of metal in a tubular shape is provided within which an elongated cylindrical inflator is mounted. The reaction housing has an open side which forms a perimeter flange. The flexible folded air bag typically formed of woven polyester or nylon material is mounted to the reaction housing around the perimeter flange. Some designs utilize four separate steel plates and fasteners to anchor the air bag to the rectangular reaction housing flange. This design requires intricate and expensive assembly fixturing to hold the plates and bag in place while rivets or screws are installed. This usually creates a limitation in the production process. In some current production modules, fourteen or more separate rivets or other fasteners are used to attached the bag in place to the reaction housing. Other designs implement steel stampings sewn into the mouth of the air bag which are held in place while screws or rivets are installed to anchor the air bag to the reaction housing. This design is perhaps an improvement but still requires many discrete fasteners.

As an improvement to the above referenced currently known designs, other techniques for simplified mounting of an air bag and inflator to a reaction housing have been proposed. These designs often incorporate an inflator which is placed within the enclosed volume of the air bag causing the air bag to be inflated from within as opposed to through an inflation opening. Often the air bag is gathered along a seam which is affixed to the reaction housing by mechanical fasteners. For example, according to U.S. Pat. Nos. 4,153,273; 4,964,654; 4,944,527 and 5,062,664, a separate cylindrical sleeve is provided with mounting studs which receive the cylindrical inflator. This assembly is placed inside the bag through an opening and a pair of flaps of the air bag are overlapped to close the opening. In each of the designs described by the above referenced patents, a separate component apart from the inflator is provided for housing and mounting the inflator. In addition, they require a number of specialized threaded fasteners for retaining the inflator in position.

In accordance with this invention an improved approach toward attaching an air bag and inflator to a reaction housing is provided. An attachment member is used which may be made of a molded plastic material can be sewn directly to the air bag fabric. One such attachment member features protruding studs which pass through holes in a pair of air bag flaps, seaming together the flaps to enclose the bag. These protruding studs fit within apertures of the reaction housing and prevent the flaps of the bag from separating in response to deployment forces and further maintain the bag attached to the reaction housing. A simplified inflator mounting approach is employed for fastening the inflator to the reaction housing. Once fastened in position, the inflator traps the attachment member such that the studs cannot be withdrawn from the reaction housing apertures in the event of air bag deployment.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
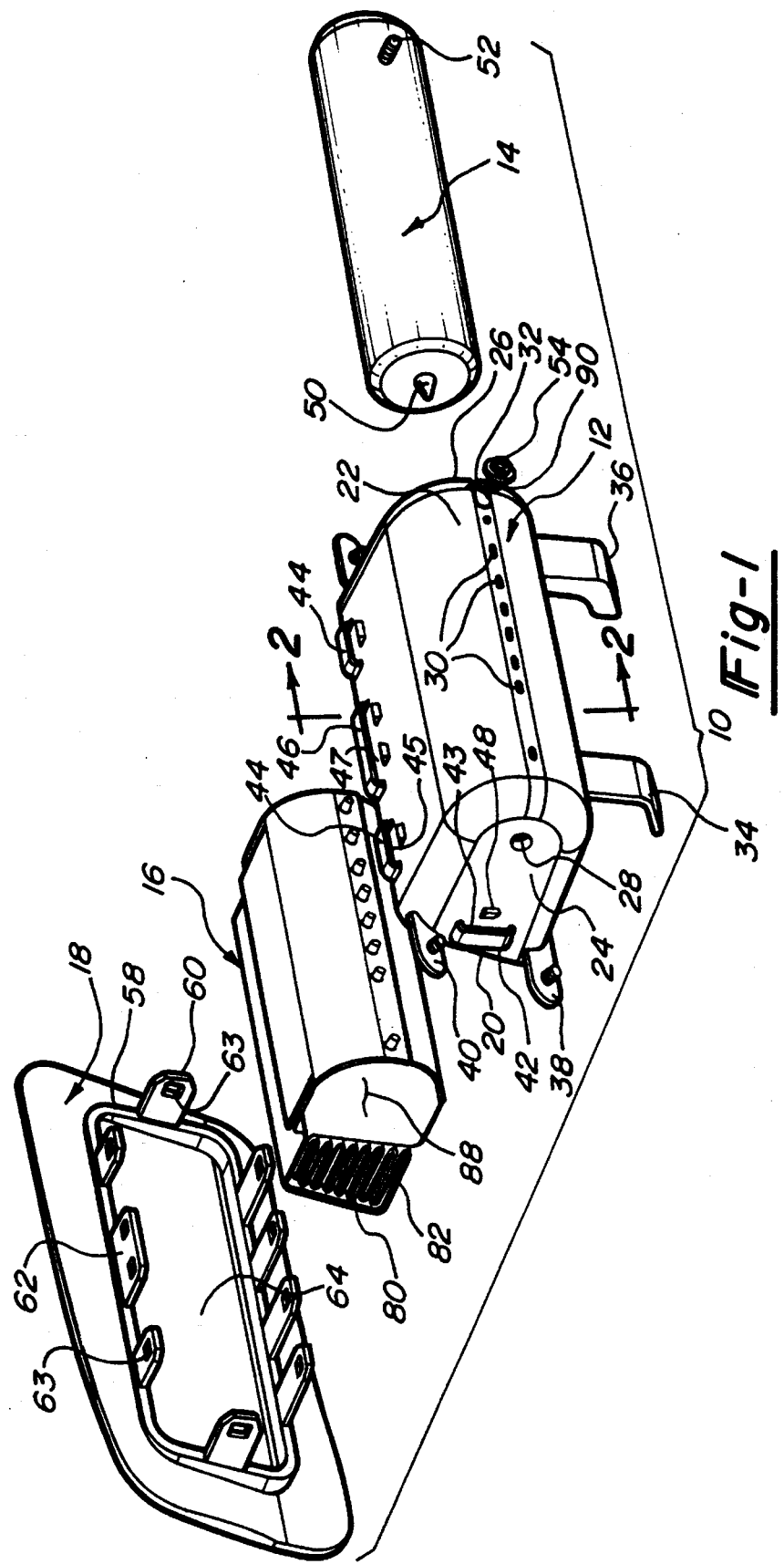
FIG. 1 is an exploded pictorial view of the passenger-side air bag module in accordance with this invention.
Figure 2:
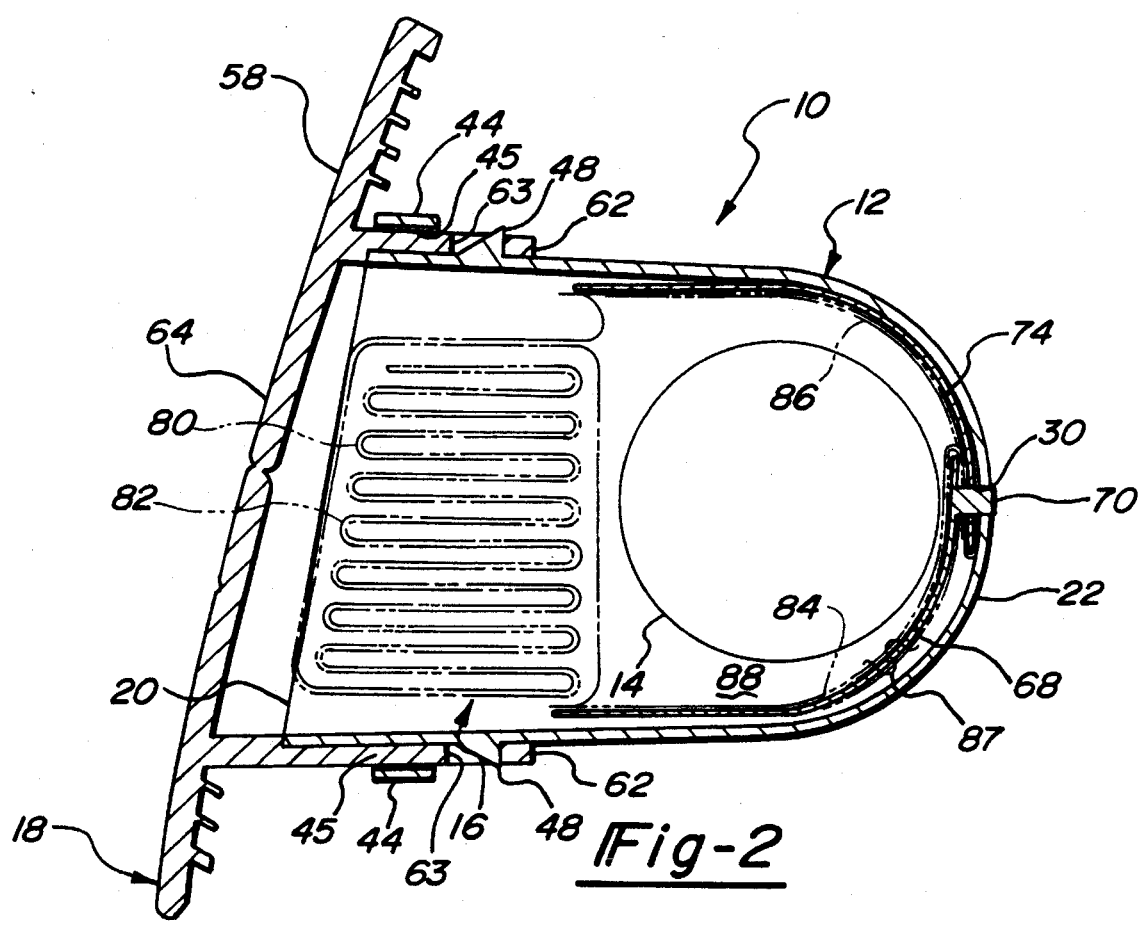
FIG. 2 is a cross-sectional view taken from FIG. 1 showing details of the module components in their assembled condition.

A passenger-side air bag module in accordance with this invention is shown in an exploded pictorial fashion in FIG. 1 and is designated there by reference number 10. As shown, module assembly 10 includes a number of principal components including reaction housing 12, inflator 14, air bag assembly 16, and module cover 18. FIG. 2 shows the internal components comprising module assembly 10 in an assembled condition and in a normal undeployed state. Module cover 18 is positioned on a surface of the vehicle's instrument panel on the passenger side of the front seat vehicle occupant area. As is conventional, upon deployment in response to an electrical crash signal from an appropriate sensor (not shown) the air bag deploys in front of the occupant to absorb impact energies.

Reaction housing 12 has an elongated tub shaped configuration having an open end or mouth 20 with an opposing closed bottom wall of 22. The reaction housing forms axial ends with a first closed end 24, with an opposing open axial end 26. Reaction housing 12 can be formed from various metal fabrication techniques such as deep drawing of sheet metal. Alternatively, and as is currently preferred, reaction housing 12 is formed by a die-casting process using aluminum or magnesium alloy material.

As best shown in FIG. 1, reaction housing 12 defines an aperture 28 within closed end 24. In addition, a series of aligned apertures 30 are formed along closed bottom 22 as shown. Slot 32 is formed adjacent to open end 26. Reaction housing 12 further defines a number of mounting structures including legs 34 and 36, and tabs 38 and 40. These mounting structures provide for secure mounting of the module assembly 10 within the vehicle. Spaced around open end 20 of the reaction housing are a series of integrally formed bands 42, 44 and 46 defining slots 43, 45, and 47, respectfully. The band members coupled with ramps or wedge features 48 provide a means for "snap-fit" mounting of module cover 18 onto reaction housing 12.

Inflator 14 is configured as an elongated cylinder and contains an internal gas generating material which responds to an externally applied electrical crash signal, in accordance with conventional air bag design features. Inflator 14 however, includes unique mounting features including conical end post 50 and threaded stud 52. End post 50 is centrally disposed on one axial end of inflator 14 and fits into reaction housing aperture 28 when in its installed position within the reaction housing. Threaded stud 52 passes through slot 32 and is engaged by fastener nut 54.

Module cover 18 is preferably formed of a flexible polymeric material compatible with motor vehicle interior trim applications. Module cover 18 defines a perimeter flange 58 and a series of projecting legs 60 and 62 having apertures 63. Legs 60 and 62 enter reaction housing slots 43, 45 and 47 and are pushed until their apertures 63 engage with ramps 48 where they are then snap-fitted into position. FIG. 2 shows the cover 18 in its final assembled condition. The central area of module cover 18 defines a deployment door 64 which is scored or otherwise manufactured to tear in a predetermined manner to allow deployment of the air bag.

Figure 3:
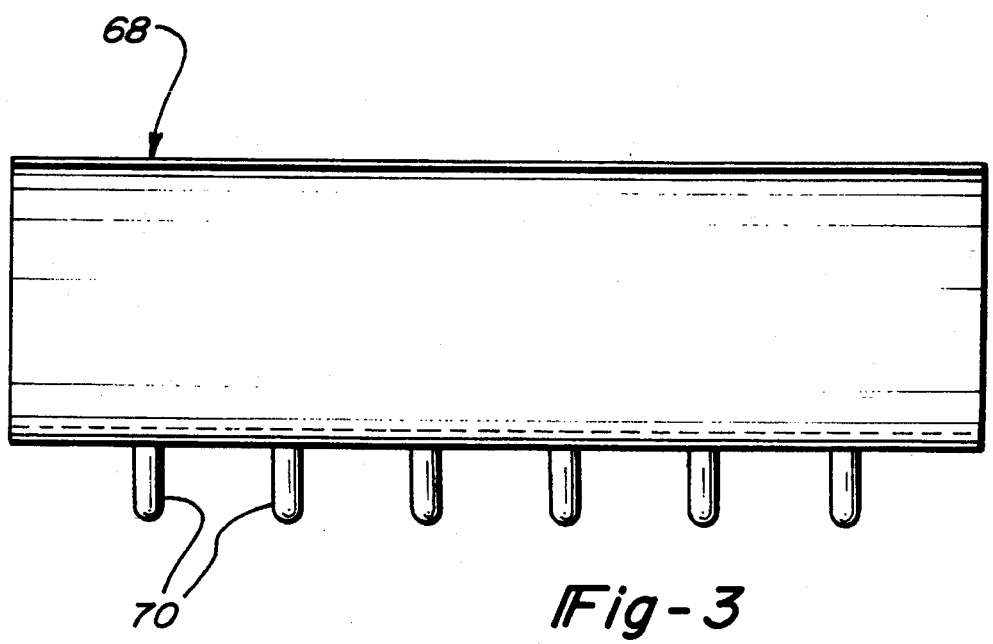
FIG. 3 is a side-view of a first air bag attachment member.

A principle feature of the present invention is the configuration of air bag assembly 16. Air bag assembly 16 is formed of a woven polyester or nylon or other fabric conventionally used for such application. Air bag assembly 16 features a pair of attachment members best shown with reference to FIGS. 3 and 4. A first attachment member 68 shown in FIG. 3 and in section in FIG. 2 is formed of a flexible elastomeric material and has an elongated arcuate configuration. A series of studs 70 project from the outside arcuate surface of member 68 near one edge. Studs 70 are preferably equal in number to reaction housing apertures 30 and are arranged and spaced so that they pass through the reaction housing apertures.

Figure 4:
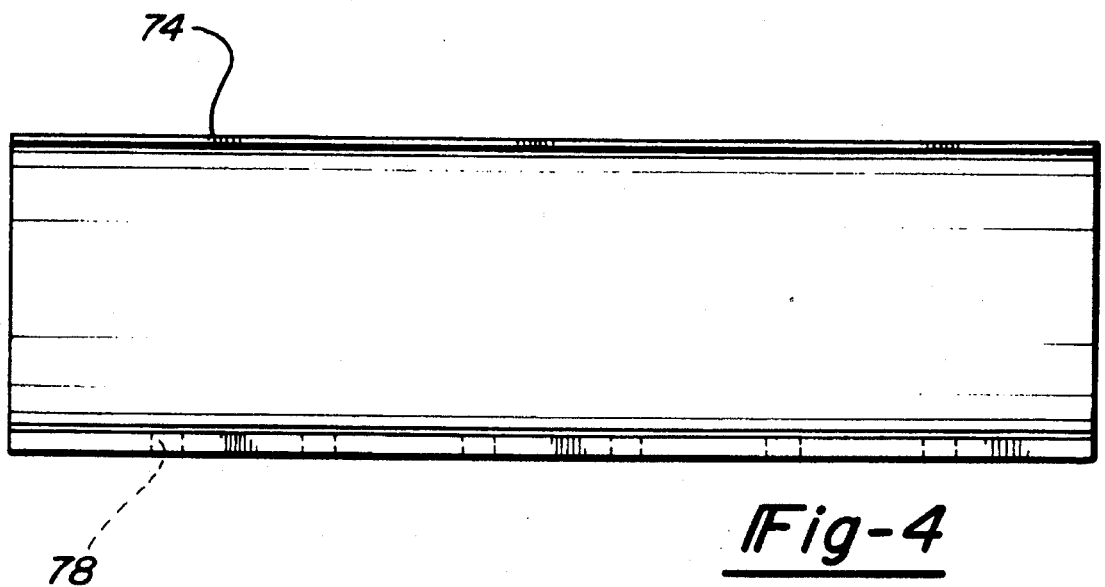
FIG. 4 is a side-view of a second air bag attachment member.

A second attachment member 74 shown in FIG. 4 has a shape complementary to that of attachment member 68 and may be formed of the same flexible elastomeric material. Attachment member 74 however, defines a series of apertures 78 which are arranged and sized to receive attachment member studs 70 and are located adjacent to an edge of the attachment member.

As shown in FIG. 2 air bag fabric 80 is folded in a precise manner in its installed condition within reaction housing 12. Folded portion 82 is positioned between inflator 14 and module cover 18. Air bag fabric 80 also has a pair of extending flaps 84 and 86 which define free edges of the air bag fabric.

Attachment members 68 and 74 are attached to air bag flaps 84 and 86, respectfully. As shown, air bag flap 84 is wrapped over both the outside and inside arcuate surfaces of attachment member 68 and is preferably stitched in place by placing stitches (shown as several example stitches in FIG. 2) placed completely through both layers of air bag fabric and attachment member 68. To facilitate such stitching operation, attachment member 68 (and 74) are formed of a material which can be readily penetrated by conventional air bag fabric sewing machinery. Air bag fabric 80 is scored or punched in the areas overlying attachment member studs 70, allowing the studs to protrude through the fabric. In a similar fashion, flap 86 is wrapped over both surfaces of attachment member 74 and is stitched in place. The fabric of flaps 84 is also scored or otherwise pierced to permit studs 72 to protrude.

Air bag assembly 16 as shown in FIG. 1 can be formed of a sub-assembly, fully folded and ready for incorporation into module assembly 10. After folding of folded portion 82, attachment member studs 70 are pressed through attachment member apertures 78. Preferably, studs 70 and apertures 78 are dimensioned to provide an interference fit, thus retaining the components in an assembled condition prior to final assembly. The rigidity of attachment members 68 and 74 and their arcuate shape combined to define a hollow inflator pocket 88 in air cushion assembly 16.

Now with reference to FIG. 1, assembly of air bag module 10 will be described. Air bag assembly 16 folded as a subassembly as previously described and is loaded into reaction housing open end 20 and placed in position such that attachment member studs 70 interfit and pass through reaction housing apertures 30. Studs 70 and apertures 30 can be dimensioned to provide a slight interference fit condition thus aiding in maintaining the parts in an assembled condition prior to final assembly. Inflator pocket 88 is closed at its end which lays across reaction chamber closed end 24 when in the assembled condition. The opposing end of inflator pocket 88 is opened to allow insertion of the inflator. If desired, after forming of the sub-assembly the unit can be shrink wrapped with plastic sheeting to protect the assembly.

After air bag assembly 16 is loaded in position, inflator 14 can be inserted through reaction housing open end 26 and into inflator pocket 88. Inflator 14 is positioned such that conical end posts 50 interfits within reaction housing aperture 28. During this sequence, threaded stud 52 is fit through slot 32 and nut 54 is threaded. As shown in FIG. 1, wall 90 is provided to trap nut 54 from being displaced axially out of the reaction housing. The orientation of inflator 14 in the assembled condition is better shown with reference to FIG. 2. As shown, inflator 14 is positioned very close to reaction housing closed bottom 22. By this positioning, inflator 14 acts to clamp attachment members 68 and 74 in position, and in particular, prevents the withdrawal of attachment member studs 70 from attachment member aperture 78 or reaction housing apertures 30. To complete assembly, module cover 18 is loaded and snap-fit in position. The assembly sequence of module assembly 10 can be accomplished in an exceptionally efficient process. Only a single threaded fastener namely; stud 52 needs to be secured.

FIG. 2 illustrates the normal undeployed condition of module assembly 10 as it is packaged in a vehicle. In the event that a crash is detected, an electrical deployment signal is sent to inflator 14 which is then caused to generate inflation gases. These gases escape from vent passages on inflator 14 (not shown) and pressurize the inside of air bag assembly 16. This inflation causes deployment door 64 to burst open, allowing deployment and extension of the folded portion 82 of the air bag. In the deployment sequence attachment members 68 and 74 perform multiple functions. The interfitting relationship between attachment members 68 and 74 prevent air bag flaps 84 and 86 from becoming separated, thus maintaining the integrity of the gas volume defined by air bag fabric 80. Despite that fact that attachment members 68 and 74 are formed of polymeric materials, the interfitting relationship between attachment member studs 70, apertures 78, and reaction housing apertures 30 provide sufficient structural integrity to sustain deployment and restraint loads. This feature is in part attributable to the fact that posts 70 are primarily loaded in shear and are quite strong when loaded in that manner.

Figure 5:
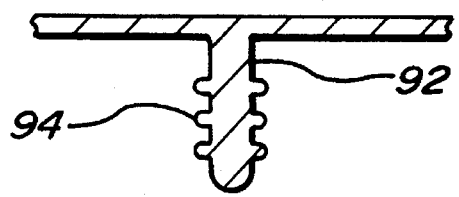
FIG. 5 is a partial sectional view of an alternate embodiment of a stud of the first attachment member.

An alternate embodiment for attachment member posts is shown by FIG. 5 which is designated by reference number 92. Post 92 has circumferential ribs 94 which further assist in maintaining the attachment members together and maintaining engagement with reaction housing 12. Numerous other configurations of posts could be implemented for providing positive retention of the parts.

While the above description constitutes the preferred embodiments of the present invention, it will be appreciated that the invention is susceptible of modification, variation and change without departing from the proper scope and fair meaning of the accompanying claims.

I claim:

1. An air bag occupant restraint system module for a motor vehicle, comprising:

a generally tub shaped elongated reaction housing defining opposing axial ends with an open area and an opposed bottom surface extending therebetween, said bottom surface forming a plurality of apertures, an elongated generally cylindrical inflator adapted to be disposed within said reaction housing for generating an inflation gas in response to a deployment signal, an air bag made of a flexible material for forming a generally enclosed volume for receiving said inflation gas, said bag further forming a folded portion and a pair of flaps, an air bag attachment member formed of a flexible material in the shape of an elongated panel defining inside and outside panel surfaces and having a plurality of studs protruding from said outside panel surface, said flaps forming a plurality of apertures wherein said bag attachment member studs pass through said flap apertures and said reaction housing apertures to enclose said air bag around said inflator and said studs acting to maintain said flaps together in the event of a deployment of said air bag, said attachment member assuming an arcuate shape upon installation within said reaction housing thereby creating a volume within said reaction housing to accept said inflator and further acting to fasten said air bag to said reaction housing, and mounting means for mounting said inflator within said reaction housing with said air bag enveloping said inflator and said bag flaps and said attachment member studs positioned adjacent said reaction housing bottom surface and said folded portion of said bag positioned adjacent said reaction housing open area, said inflator acting to trap said attachment member between said inflator and said reaction housing bottom surface thereby maintaining said studs within said reaction housing apertures.

2. An air bag occupant restraint system module according to claim 1 further comprising a second air bag attachment member formed of a flexible material defining a plurality of apertures and affixed to one of said flaps with said studs passing through said second attachment member apertures.

3. An air bag occupant restraint system module according to claim 1 wherein said attachment member is affixed to one of said flaps by stitching.

4. An air bag occupant restraint system module according to claim 2 wherein said second attachment member is affixed to one of said flaps by stitching.

5. An air bag occupant restraint system module according to claim 1 wherein said mounting means comprising a first post member extending from a first axial end of said inflator and interfitting with inflator mounting an aperture within one of said reaction housing axial ends and a second post member extending from a side of said inflator adjacent a second axial end of said inflator and engaging said reaction housing.

6. An air bag occupant restraint system module according to claim 1 further comprising said attachment member studs having a smooth cylindrical surface and forming an interference fit within said reaction housing apertures.

7. An air bag occupant restraint system module according to claim 1 further comprising said attachment member studs having radially extending features for forming snap attachment within said reaction housing apertures.

8. An air bag occupant restraint system module according to claim 1 wherein said attachment member comprising an arcuate panel defining inside and outside arcuate major face surface with said studs projecting from said outside major face surface of said panel.

9. An air bag occupant restraint system module according to claim 2 wherein said second attachment member comprising an arcuate panel with said apertures formed through said panel.

10. An air bag occupant restraint system module for a motor vehicle, comprising:

a generally tub shaped elongated reaction housing defining opposing first and second axial ends with an open area and an opposed bottom surface extending therebetween, said bottom surface forming a plurality of apertures and said first axial end being generally closed and said second axial end being generally opened, an elongated generally cylindrical inflator adapted to be disposed within said reaction housing for generating an inflation gas in response to a deployment signal, an air bag made of a flexible material for forming a generally enclosed volume for receiving said inflation gas, said bag further forming a pair of flaps, a first air bag attachment member formed of a flexible material and in the shape of an elongated panel defining inside and outside panel surfaces and having a plurality of studs protruding from said outside panel surface adjacent an edge of said panel, said first attachment member panel being sewn to one of said bag flaps, a second bag attachment member formed of a flexible material in the shape of an elongated panel and forming a plurality of apertures adjacent an edge of said panel, said second attachment member being sewn to the other of said bag flaps and said apertures arranged such that said bag attachment studs pass through said second bag attachment member apertures and said tub apertures to enclose said bag around said inflator and said studs acting to maintain said flaps together in the event of a deployment of said bag, and mounting means for mounting said inflator within said reaction housing with said bag enveloping said inflator and said bag flaps and said first attachment member studs positioned adjacent said reaction housing bottom surface and a folded portion of said bag positioned adjacent said reaction housing open area, said inflator acting to trap said attachment members between said inflator and said reaction housing bottom surface thereby maintaining said studs in position within said reaction housing apertures.

11. An air bag occupant restraint system module according to claim 10 wherein said mounting means comprising a first post member extending from a first axial end of said inflator and interfitting with an aperture within said first reaction housing axial ends and a second post member extending from a side of said inflator adjacent a second axial end of said inflator and engaging said reaction housing.

12. An air bag occupant restraint system module according to claim 10 further comprising said first attachment member studs having a smooth cylindrical surface and forming an interference fit within said reaction housing apertures.

13. An air bag occupant restraint system module according to claim 10 further comprising said attachment member studs having radially extending features for forming snap attachment within said reaction housing apertures.

14. A method of manufacturing an air cushion occupant restraint system module assembly for a motor vehicle, comprising the steps of:

providing a generally tub shaped elongated reaction housing defining opposing axial ends with an open area and an opposed bottom surface extending therebetween, said bottom surface forming a plurality of apertures with said first axial end being generally closed and said second end being generally opened, providing an elongated generally cylindrical inflator adapted to be disposed within said reaction housing for generating an inflation gas in response to a deployment signal, providing an air bag made of a flexible material for forming a generally enclosed volume for receiving said inflation gas, said bag further forming a pair of flaps, providing a first bag attachment member formed of a flexible material and in the shape of an elongated panel and having a plurality of studs protruding from one surface of said panel, sewing said first attachment member panel to one of said bag flaps, providing a second bag attachment member formed of a flexible material in the shape of an elongated panel and forming a plurality of apertures, sewing said second attachment member to the other of said flaps, providing mounting means for mounting said inflator within said reaction housing, folding said bag to define a stacked folded portion with said first and second flaps extending from said folded portion, inserting said first attachment member studs through said apertures of said second attachment member, inserting said bag into said reaction housing and passing said studs through said reaction housing bottom surface apertures, and inserting said inflator in said reaction housing and said bag and securing said mounting means wherein said inflator acting to trap said attachment member between said inflator and said reaction housing bottom surface thereby maintaining said studs in position within said reaction housing apertures.

15. An air bag occupant restraint system module for a motor vehicle, comprising:

a generally tub shaped elongated reaction housing defining opposing axial ends with an open area and an opposed bottom surface extending therebetween, said bottom surface forming a plurality of apertures, an elongated generally cylindrical inflator adapted to be disposed within said reaction housing for generating an inflation gas in response to a deployment signal, an air bag made of a flexible material for forming a generally enclosed volume for receiving said inflation gas, said bag further forming a pair of flaps, an air bag attachment member formed of a flexible material and having a plurality of protruding studs, said attachment member in the form of a panel defining inside and outside major face surfaces with said studs projecting from said outside major face surface of said panel, said attachment member being affixed to one of said bag flaps and the other of said flaps forming a plurality of apertures wherein said bag attachment member studs pass through said flap apertures and said reaction housing apertures to enclose said air bag around said inflator and said studs acting to maintain said flaps together in the event of a deployment of said bag, and further acting to fasten said air bag to said reaction housing, and mounting means for mounting said inflator within said reaction housing with said bag enveloping said inflator and said bag flaps and said attachment member studs positioned adjacent said reaction housing bottom surface and a folded portion of said bag positioned adjacent said reaction housing open area, said inflator acting to trap said attachment member between said inflator and said reaction housing bottom surface thereby maintaining said studs within said reaction housing apertures.

* * * * *